United States Patent
Stefik et al.

(10) Patent No.: US 8,209,616 B2
(45) Date of Patent: Jun. 26, 2012

(54) SYSTEM AND METHOD FOR INTERFACING A WEB BROWSER WIDGET WITH SOCIAL INDEXING

(75) Inventors: Mark Jeffrey Stefik, Portola Valley, CA (US); Lawrence Lee, Menlo Park, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 522 days.

(21) Appl. No.: 12/506,178

(22) Filed: Jul. 20, 2009

(65) Prior Publication Data

US 2010/0058195 A1    Mar. 4, 2010

Related U.S. Application Data

(60) Provisional application No. 61/092,738, filed on Aug. 28, 2008.

(51) Int. Cl.
   *G06F 3/048* (2006.01)
   *G06F 7/00* (2006.01)
(52) U.S. Cl. .................. 715/744; 707/708
(58) Field of Classification Search .......... 715/744
   See application file for complete search history.

(56) References Cited

U.S. PATENT DOCUMENTS

| | | |
|---|---|---|
| 5,257,939 A | 11/1993 | Robinson et al. |
| 5,369,763 A | 11/1994 | Biles |
| 5,530,852 A | 6/1996 | Meske et al. |
| 5,671,342 A | 9/1997 | Millier et al. |
| 5,680,511 A | 10/1997 | Baker et al. |
| 5,724,567 A | 3/1998 | Rose et al. |
| 5,784,608 A | 7/1998 | Meske et al. |
| 5,907,677 A | 5/1999 | Glenn et al. |
| 5,907,836 A | 5/1999 | Sumita et al. |
| 5,953,732 A | 9/1999 | Meske et al. |
| 6,021,403 A | 2/2000 | Horvitz et al. |

(Continued)

FOREIGN PATENT DOCUMENTS

EP    1571579    9/2005

(Continued)

OTHER PUBLICATIONS

C. Anderson, "The Long Tail: Why the Future of Business is Selling Less of More," 2006, Chapter 1, pp. 1-26, Hyperion Press, New York.

(Continued)

*Primary Examiner* — Weilun Lo
*Assistant Examiner* — Amy M Levy
(74) *Attorney, Agent, or Firm* — Patrick J. S. Inouye

(57) ABSTRACT

A system and method for interfacing a Web browser widget with social indexing is provided. Electronically-stored articles and a plurality of social indexes that are each associated with a social community are maintained. Each social index includes topics that each relate to at least one such article and a topic model for each topic. A widget remotely executing on a Web browser is interfaced and a request identifying one such social community is accepted. A Web page currently in view on the Web browser is identified and content included in the Web page is obtained. The social index for the social community is obtained. The topic models in the social index are evaluated against the content. Topically-relevant information based on the topics in the social index corresponding to those of the topic models matched to the content is selected. The topically-relevant information is provided to the widget arranged for presentation.

24 Claims, 8 Drawing Sheets

U.S. PATENT DOCUMENTS

| | | | |
|---|---|---|---|
| 6,052,657 A | 4/2000 | Yamron et al. | |
| 6,064,952 A | 5/2000 | Imanaka et al. | |
| 6,233,570 B1 | 5/2001 | Horvitz et al. | |
| 6,233,575 B1* | 5/2001 | Agrawal et al. | 1/1 |
| 6,240,378 B1 | 5/2001 | Imanaka et al. | |
| 6,247,002 B1 | 6/2001 | Steels | |
| 6,269,361 B1* | 7/2001 | Davis et al. | 1/1 |
| 6,285,987 B1 | 9/2001 | Roth et al. | |
| 6,292,830 B1 | 9/2001 | Taylor et al. | |
| 6,397,211 B1* | 5/2002 | Cooper | 707/706 |
| 6,598,045 B2 | 7/2003 | Light et al. | |
| 6,772,120 B1 | 8/2004 | Moreno et al. | |
| 6,804,688 B2 | 10/2004 | Kobayashi et al. | |
| 6,981,040 B1 | 12/2005 | Konig et al. | |
| 7,062,485 B1 | 6/2006 | Jin et al. | |
| 7,092,888 B1 | 8/2006 | McCarthy et al. | |
| 7,200,606 B2 | 4/2007 | Elkan | |
| 7,275,061 B1 | 9/2007 | Kon et al. | |
| 7,281,022 B2 | 10/2007 | Gruhl et al. | |
| 7,293,019 B2* | 11/2007 | Dumais et al. | 707/754 |
| 7,320,000 B2* | 1/2008 | Chitrapura et al. | 1/1 |
| 7,426,557 B2 | 9/2008 | Gruhl et al. | |
| 7,467,202 B2 | 12/2008 | Savchuk | |
| 7,496,567 B1* | 2/2009 | Steichen | 1/1 |
| 7,548,917 B2 | 6/2009 | Nelson | |
| 7,567,959 B2* | 7/2009 | Patterson | 1/1 |
| 7,600,017 B2* | 10/2009 | Holtzman et al. | 709/224 |
| 7,685,224 B2 | 3/2010 | Nye | |
| 7,707,206 B2 | 4/2010 | Encina et al. | |
| 7,747,593 B2 | 6/2010 | Patterson et al. | |
| 7,809,723 B2 | 10/2010 | Liu et al. | |
| 7,890,485 B2 | 2/2011 | Malandain et al. | |
| 7,921,092 B2 | 4/2011 | Anick et al. | |
| 8,010,545 B2* | 8/2011 | Stefik et al. | 707/758 |
| 8,073,682 B2* | 12/2011 | Stefik | 704/9 |
| 2002/0161838 A1 | 10/2002 | Pickover et al. | |
| 2004/0059708 A1 | 3/2004 | Dean et al. | |
| 2005/0097436 A1 | 5/2005 | Kawatani | |
| 2005/0226511 A1 | 10/2005 | Short | |
| 2005/0278293 A1 | 12/2005 | Imaichi et al. | |
| 2006/0167930 A1 | 7/2006 | Witwer et al. | |
| 2007/0050356 A1 | 3/2007 | Amadio | |
| 2007/0156622 A1 | 7/2007 | Akkiraju et al. | |
| 2007/0214097 A1 | 9/2007 | Parsons et al. | |
| 2007/0239530 A1 | 10/2007 | Datar et al. | |
| 2007/0244690 A1 | 10/2007 | Peters | |
| 2007/0260508 A1 | 11/2007 | Barry et al. | |
| 2007/0260564 A1 | 11/2007 | Peters et al. | |
| 2007/0271086 A1 | 11/2007 | Peters et al. | |
| 2008/0040221 A1 | 2/2008 | Wiseman et al. | |
| 2008/0065600 A1 | 3/2008 | Batteram et al. | |
| 2008/0126319 A1 | 5/2008 | Bukai et al. | |
| 2008/0133482 A1 | 6/2008 | Anick et al. | |
| 2008/0201130 A1 | 8/2008 | Peters et al. | |
| 2008/0307326 A1 | 12/2008 | Gruhl et al. | |
| 2010/0042589 A1 | 2/2010 | Smyros et al. | |
| 2010/0070485 A1 | 3/2010 | Parsons et al. | |
| 2010/0114561 A1 | 5/2010 | Yasin | |
| 2010/0278428 A1 | 11/2010 | Terao | |

FOREIGN PATENT DOCUMENTS

| | | |
|---|---|---|
| WO | 2005073881 | 8/2005 |
| WO | 2007047903 | 4/2007 |

OTHER PUBLICATIONS

G. Sacco, "Dynamic Taxonomies and Guided Searches," Journal of the American Society for Information Science and Technology, vol. 57, Issue 6, Apr. 2006.

Rajashekar et al., "Combining Automatic and Manual Index Representations in Probabilistic Retrieval," www.google.com, Journal of the American Society for Information Science 46(4) 272-283 1995 (c) John Wiley and Sons.

Card et al., "Readings in Information Visualization: Using Vision to Think," 1999, Section 3 Interaction, pp. 231-259, 295-306, Morgan Kaufmann Publishers, San Francisco.

Chi et al., "EBooks With Indexes that Reorganize Conceptually," Paper presented at Human Factors in Computing Systems Conference Apr. 24-29, 2004, Vienna, Austria.

G. W. Furnas, "Generalized Fisheye Views," Paper presented at the Conference on Human Factors in Computing Systems, 1986, Boston, Massachusetts.

Kusek et al., "The Future of Music: Manifesto for the Digital Music Revolution," Boston: Berklee Press, 2005.

P. Pirolli, "Information Foraging Theory: Adaptive Interaction with Information," Oxford: Oxford University Press, 2007.

H. Simon, "Designing Organizations for an Information-Rich World." In Communications and the Public Interest, ed. Martin Greenberger. 37-72. The Johns Hopkins Press, 1971.

R. D. Burt, "Structural Holes and Good Ideas," American Journal of Sociology, vol. 110, No. 2, pp. 349-399, 2003.

C. Mezei, "The Digg Algorithm-Unofficial FAQ," SeoPedia, www.secopedia.org/tips-tricks/social-media/the-digg-algorithm-unofficial-faq, Nov. 2, 2006.

N. Patel, "There's More to Digg Than Meets the Eye," Pronet Advertising, www.pronetadvertising.com/articles/ theres-more-to-digg-than-meets-the-eye.html, Jan. 15, 2007.

J. Dowdell et al., "Digg's Kevin Rose on Recent Indiggnation: Fact vs. Fiction," Marketing Shift, www.marketingshift.com/2006/9/diggs-kevin-rose-recent-indiggnation.cfm, Sep. 7, 2006.

J. Dowdell, "Digg Algorithm for Scoring Stories," Marketing Shift, www.marketingshift.com/2006/9/diggs-algorithm-elements-confirmed.cfm, Sep. 8, 2006.

P. Lenssen, "How Google News Indexes". See http://blogoscoped.com/archive/2006-07-28-n49.html.

A. Agarval, "How Google News works". http://labnol.blogspot.com/2005/05/how-google-news-works.html.

M. Helft, "How a Series of Mistakes Hurt Shares of United". New York Times. http://www.nytimes.com/2008/09/15/technology/15google.html?_r=1.

J. Preston, "Why Google News works." http://eatsleeppublish.com/why-google-news-works/.

Imai et al., "Improved Topic Discrimination of Broadcast News Using a Model of Multiple Simultaneous Topics," 1997 IEEE International Conference on Acoustics, Speech, and Signal Processing (ICASSP'97), Apr. 1997, pp. 727-730, vol. 2.

Anonymous "TF-IDF," Wikipedia, the free encyclopedia (Jul. 23, 2007).

Akiko Aizawa, "An Information-Theoretic Perspective of TF-IDF Measures," Information Processing and Management, Elsevier Science Ltd., vol. 39, No. 1, pp. 45-65 (Jan. 1, 2003).

Rocha L. M., "Adaptive Webs for Heterarchies With Diverse Communities of Users," Workshop From Intelligent Networks to the Global Brain: Evolutionary Technology, pp. 1-35 (Jul. 3, 2001).

Arasu et al., "Searching the Web," ACM, New York, NY, US, pp. 2-43 (Aug. 1, 2001).

G. Linden, "People Who Read This Article Also Read . . ." IEEE Spectrum, vol. 45, No. 3, pp. 46-60 (Mar. 1, 2008).

K. Lerman, "Social Information Processing in News Aggregation," IEEE Computer Society, vol. 11, No. 6, pp. 16-28 (Nov. 1, 2007).

C. Holahan, "So Many Ads, So Few Clicks," BusinessWeek, p. 38 (Nov. 12, 2007).

G. Miller, "The Magical No. Seven, Plus or Minus Two: Some Limits on our Capacity for Processing Information," Psychological Review, vol. 63, pp. 81-97 (1956).

* cited by examiner

SYSTEM AND METHOD FOR INTERFACING A WEB BROWSER WIDGET WITH SOCIAL INDEXING

CROSS-REFERENCE TO RELATED APPLICATION

This non-provisional patent application claims priority under 35 U.S.C. §119(e) to U.S. Provisional Patent Application Ser. No. 61/092,738, filed Aug. 28, 2008, the disclosure of which is incorporated by reference.

FIELD

This application relates in general to the organization and retrieval of online information and, in particular, to a system and method for interfacing a Web browser widget with social indexing.

BACKGROUND

The Worldwide Web ("Web") is an open-ended digital information repository into which new information is continually posted and read by different bodies of "stakeholders" that are each involved with Web information provisioning and use to varying degrees. The information on the Web can, and often does, originate from diverse sources, including authors, editors, bloggers, collaborators, and outside contributors commenting, for instance, through a Web log, or "blog." Such diversity suggests a potentially expansive topical index, which, like the underlying information, continuously grows and changes.

Topically organizing an open-ended information source, like the Web, can facilitate information discovery and retrieval, such as described in commonly-assigned U.S. patent application, entitled "System and Method for Performing Discovery of Digital Information in a Subject Area," Ser. No. 12/190,552, filed Aug. 12, 2008, pending, the disclosure of which is incorporated by reference. Books have long been organized with topical indexes. However, constraints on codex form limit the size and page counts of books, and hence index sizes. In contrast, Web materials lack physical bounds and can require more extensive topical organization to accommodate the full breadth of subject matter covered and to satisfactorily address the needs of different Web stakeholders.

One body of stakeholders, information producers and, in particular, blog authors or "bloggers," often write about multiple topics, yet each blogger's writings are ordinarily combined under a single Web site. Keeping a blog Web site well-organized increases the effort necessary to maintain the site and detracts from the raison d'être for blogging. Moreover, bloggers typically organize their Web sites by date, rather than by topic, and a minority of bloggers tag their articles by keyword or topic. Article tagging, though, entails extra work for bloggers, and when new tags that describe old previously-tagged topics emerge, updating existing content under the new tags can be tedious, time-consuming, and often impracticable. Additionally, bloggers frequently embed hyperlinks to high-quality blogs on the same topic that have been written by other bloggers. Linking blog Web sites increases Web traffic for all bloggers whose Web sites are linked, yet each blogger has to manually maintain each hyperlink, which can become stale if a hyperlink to any of the linked Web sites change or become outdated.

Another body of stakeholders, information seekers, include those online readers or users that expend significant amounts of time trying to find bloggers with the best information. Generally, sifting through each of the articles written by every blogger to find the best articles on a particular topic can require considerable user effort. Thus, some users employ blog reading tools that support voting on articles by Web users at-large, yet these tools are often disorganized and not supported by communities of on-topic and like-minded users. Also, the quality and usefulness of the voting are frequently uneven or inconsistent. Other users use search tools to find topically-relevant blog articles. However, since the users may not even know the proper search terms required to find the new articles, search tools are not particularly effective for keeping up on new articles in specific topics. And even when new articles are found, users are often challenged in effectively sharing the perspectives gained through their efforts.

A third body of stakeholders, companies offering products and services over the Web, generally try to match their advertisements to topically-related Web sites through targeted advertising, which is a cost-effective alternative to arranging advertising with every blogger in their industry. For instance, Ad Sense, offered by Google Inc., Mountain View, Calif., places advertisements on different parts of a Web page as determined by auction. Advertisers bid for key words that are used to match online advertisements, or advertisements are associated with general search queries that are matched against the contents of Web pages. However, advertising opportunities are still missed when information on a Web page fails to trigger key word targeting logic to propose an appropriate advertisement, and where inherently ambiguous terms lack sufficient context for differentiating between different markets to properly target online advertising.

A fourth body of stakeholders, social indexing Web sites, are among many of the various types of Web sites competing for user attention. In general, a Web site is reached either by a user specifying the Web site's hyperlink, that is, Uniform Resource Locator (URL) explicitly, or by a Web site being selected through search results generated by a search engine. This challenge to being discovered by users creates potential challenges, particularly for a new Web site or a Web site with a relationship with a competitive search engine provider.

Accordingly, there is a need for an approach to enabling each of the foregoing stakeholders to facilitate efficient Web information creation, sharing, and advertising.

SUMMARY

Widgets are programming objects placed on Web pages that perform computations and display information when people view those pages in Web browsers. The current implementation uses a conventional widget architecture to provide social indexing services based on the content of the Web pages. The widgets can be used for content publisher pages, such as blogs, for members of social networks, and for other uses.

One embodiment provides a system and method for interfacing a Web browser widget with social indexing. Electronically-stored articles and a plurality of social indexes that are each associated with a social community are maintained. Each social index includes topics that each relate to at least one such article and a topic model for each topic. A widget remotely executing on a Web browser is interfaced and a request from the widget that identifies one such social community is accepted. A Web page currently in view on the Web browser is identified and content included in the Web page is obtained. The social index for the social community is obtained. The topic models in the social index are evaluated against the content. Topically-relevant information based on the topics in the social index corresponding to those of the topic models matched to the content is selected. The topically-relevant information is provided to the widget arranged for presentation through the Web browser via the widget on the Web page.

A further embodiment provides computer-implemented method for interfacing an individualized Web browser widget with social indexing. Electronically-stored articles and a plurality of social indexes that are each associated with a social community are maintained. Each social index includes topics that each relate to at least one such article and a topic model for each topic. A widget remotely executing on a Web browser is interfaced. A request from the widget, including parameterized information, is accepted by the social indexing system. The request may identify a member of a social community, as known by the widget. The widget may have a unique identity used by the social indexing system, and connecting to other information including a history of user interactions. The request may convey other information derived from interactions with the user of the widget, such as index or topic selections, display preferences, article votes, comments, or data from interaction with the social index or widget hosting site. A given widget may connect to more than one index in a social indexing system. One or more social indexes are obtained and topically-relevant information is selected from the social indexes. The topically-relevant information is provided to the widget arranged for presentation through the Web browser via the widget on the Web page.

The social indexing widget provides benefits to each of the aforementioned stakeholders. For information producers, such as bloggers, the social indexing system provides an automatic way to relate the current blog to a larger body of content. The blogger does not need to personally identify or tag the articles. If the set of topics evolves over time, for example, when they are renamed or specialized, the sub-index generated via the widget automatically follows. In this way, the organization of information is always an up-to-date point-of-view. In one embodiment, the sub-index connects to other articles by the blogger on the same topic. In a further embodiment, the sub-index connects to the best articles in the community's social index. With the social indexing site, the blogger's information is always cross-indexed with other sources of information in the community. Consequently, if the blogger writes well-respected articles, his traffic will increase, as readers discover his blog either at the social indexing site or via widgets on the Web pages of other bloggers.

For information seekers, that is, users or readers, the users will more easily find good articles on particular topics. Indexes on the blog sites will be up-to-date and will be organized by familiar index categories in use by the relevant community. Also, since voting on article quality within a topic occurs in an informed community, readers will get reliable guides to good information. In addition, a widget can be provided on a Web page belonging to a member of a social community to serve as a window into die community's social index from the perspective of that member. This form of widget would be particularly appropriate for subject area experts whose Web pages are frequently read.

For online companies with relevant products or services, advertising placement can take advantage of the topic structure and base of related articles in the social index, since advertising placement in the widget is governed by the social index. Even if advertisements do not match the exact keywords on the pages, the advertisements can be placed according to the relevant topic. Advertisements that might be placed on the blogger's page due to an accidental or inappropriate matching of keywords will not be placed if the advertisement does not match the characteristic words of the main articles on a topic in the community. In this way, inappropriate advertisements are avoided.

Finally, for social indexing Web sites, widgets can appear on thousands or millions of Web pages, both for information producers and information seekers. As a result, the Web "footprint" of the social indexing Web site becomes much larger. People can reach the site through any of the widgets that appear on Web pages. Advertising revenue for the indexing site can be increased because the advertisements now appear over a larger Web "footprint."

Still other embodiments will become readily apparent to those skilled in the art from the following detailed description, wherein are described embodiments by way of illustrating the best mode contemplated. As will be realized, other and different embodiments are possible and the embodiments' several details are capable of modifications in various obvious respects, all without departing from their spirit and the scope. Accordingly, the drawings and detailed description are to be regarded as illustrative in nature and not as restrictive.

DETAILED DESCRIPTION

Glossary

Figure 1:
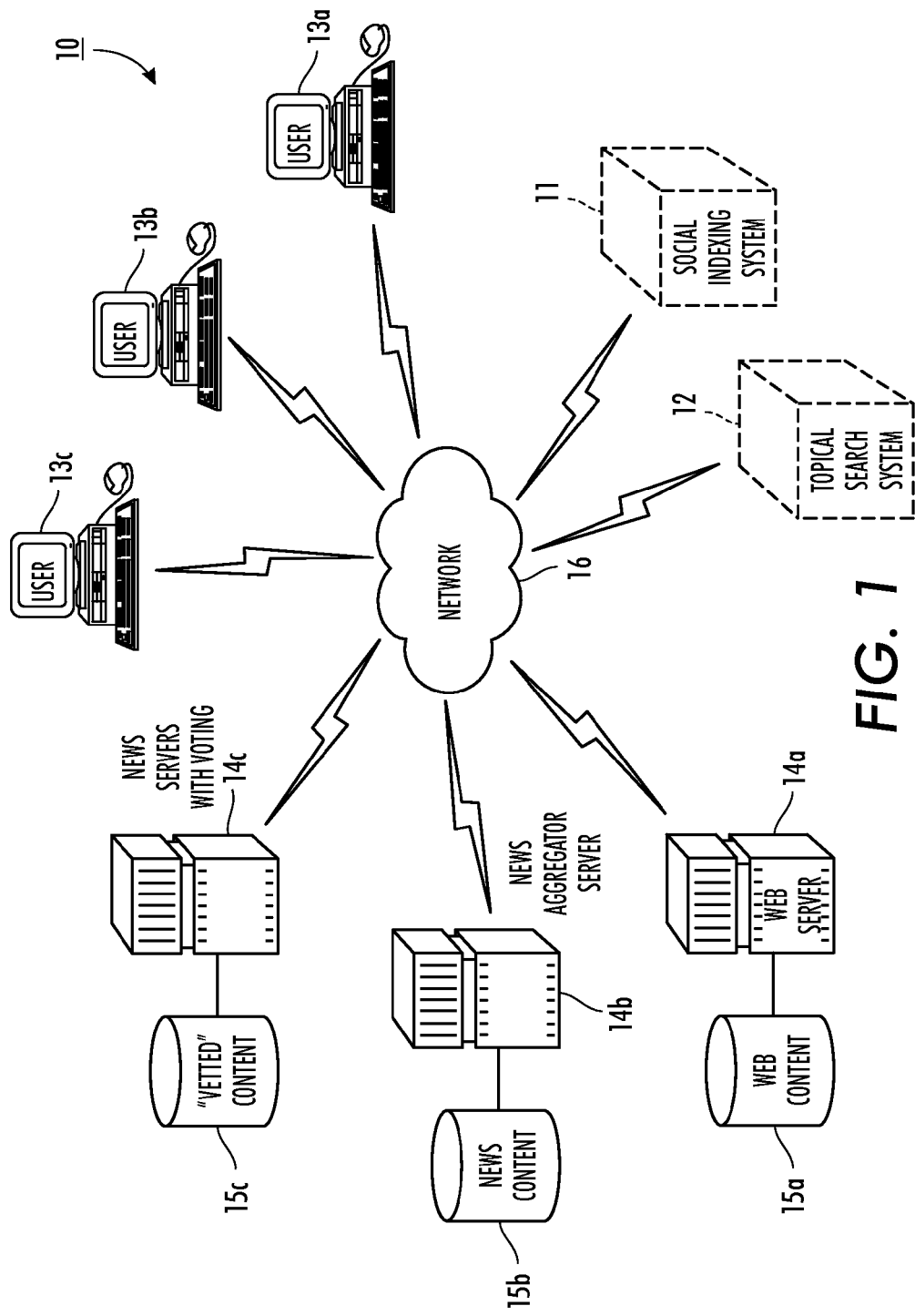
FIG. 1 is a block diagram showing an exemplary environment for digital information sensemaking and information retrieval.

The following terms are used throughout and, unless indicated otherwise, have the following meanings:

Corpus: A collection or set of articles, documents, Web pages, electronic books, or other digital information available as printed material.

Document: An individual article within a corpus. A document can also include a chapter or section of a book, or other subdivision of a larger work. A document may contain several cited pages on different topics.

Cited Page: A location within a document to which a citation in an index, such as a page number, refers. A cited page can be a single page or a set of pages, for instance, where a subtopic is extended by virtue of a fine-grained topic model for indexing and the set of pages contains all of the pages that match the fine-grained topic model. A cited page can also be smaller than an entire page, such as a paragraph, which can be matched by a fine-grained topic model.

Subject Area: The set of topics and subtopics in a social index, including an evergreen index or its equivalent.

Topic: A single entry within a social index. In an evergreen index, a topic is accompanied by a fine-grained topic model, such as a pattern, that is used to match documents within a corpus.

Subtopic: A single entry hierarchically listed under a topic within a social index. In an evergreen index, a subtopic is also accompanied by a fine-grained topic model.

Fine-grained topic model: This topic model is based on finite state computing and is used to determine whether an article falls under a particular topic. Each saved fine-grained topic model is a finite-state pattern, similar to a query. This topic model is created by training a finite state machine against positive and negative training examples.

Coarse-grained topic model: This topic model is based on characteristic words and is used in deciding which topics correspond to a query. Each saved coarse-grained topic model is a set of characteristic words, which are important to a topic, and a score indicating the importance of each characteristic word. This topic model is also created from positive training examples, plus a baseline sample of articles on all topics in an index. The baseline sample establishes baseline frequencies for each of the topics and the frequencies of words in the positive training examples are compared with the frequencies in the baseline samples. In addition to use in generating topical sub-indexes, coarse-grained models can be used for advertisement targeting, noisy article detection, near-miss detection, and other purposes.

Community: A group of people sharing main topics of interest in a particular subject area online and whose interactions are intermediated, at least in part, by a computer network. A subject area is broadly defined, such as a hobby, like sailboat racing or organic gardening; a professional interest, like dentistry or internal medicine; or a medical interest, like management of late-onset diabetes.

Augmented Community: A community that has a social index on a subject area. The augmented community participates in reading and voting on documents within the subject area that have been cited by the social index.

Evergreen Index: An evergreen index is a social index that continually remains current with the corpus.

Social Indexing System: An online information exchange infrastructure that facilitates information exchange among augmented communities, provides status indicators, and enables the passing of documents of interest from one augmented community to another. An interconnected set of augmented communities form a social network of communities.

Information Diet: An information diet characterizes the information that a user "consumes," that is, reads across subjects of interest. For example, in his information consuming activities, a user may spend 25% of his time on election news, 15% on local community news, 10% on entertainment topics, 10% on new information on a health topic related to a relative, 20% on new developments in their specific professional interests, 10% on economic developments, and 10% on developments in ecology and new energy sources. Given a system for social indexing, the user may join or monitor a separate augmented community for each of his major interests in his information diet.

Digital Information Sensemaking and Retrieval Environment

Digital information sensemaking and retrieval are related, but separate activities. The former relates to sensemaking mediated by a digital information infrastructure, which includes public data networks, such as the Internet, standalone computer systems, and open-ended repositories of digital information. The latter relates to the searching and mining of information from a digital information infrastructure, which may be topically organized through social indexing, or by other indexing source. FIG. 1 is a block diagram showing an exemplary environment 10 for digital information sensemaking and information retrieval. A social indexing system 11 and a topical search system 12 work in tandem to respectively support sensemaking and retrieval, the labors of which can, in turn, be used by information producers, such as bloggers, and information seekers, that is, end users, through widgets that execute on a Web browser.

In general, digital information is a corpus of information available in digital form. The extent of the information is open-ended, which implies that the corpus and its topical scope grow continually and without fixed bounds on either size or subject matter. A digital data communications network 16, such as the Internet, provides an infrastructure for provisioning, exchange, and consumption of the digital information. Other network infrastructures are also possible, for instance, a nonpublic corporate enterprise network. The network 16 provides interconnectivity to diverse and distributed information sources and consumers, such as between the four bodies of stakeholders, described supra, that respectively populate and access the corpus with articles and other content. Bloggers, authors, editors, collaborators, and outside contributors continually post blog entries, articles, Web pages, and the like to the network 16, which are maintained as a distributed data corpus through Web servers 14a, news aggregator servers 14b, news servers with voting 14c, and other information sources. These sources respectively serve Web content 15a, news content 15b, community-voted or "vetted" content 15c, and other information to users that access the network 16 through user devices 13a-c, such as personal computers, as well as other servers. For clarity, only user devices will be mentioned, although servers and other non-user device information consumers may similarly search, retrieve, and use the information maintained in the corpus.

In general, each user device 13a-c is a Web-enabled device that executes a Web browser or similar application, which supports interfacing to and information exchange and retrieval with the servers 14a-c. The Web browser displays Web pages as served from the information sources and widgets are included with Web pages originating from members of an augmented community, as further described below beginning with reference to FIG. 2. The widgets can be used for content publisher pages, such as blogs, for members of social networks, and for other uses.

Both the user devices 13a-c and servers 14a-c include components conventionally found in general purpose programmable computing devices, such as a central processing unit, memory, input/output ports, network interfaces, and nonvolatile storage. Other components are possible. As well, other information sources in lieu of or in addition to the servers 14a-c, and other information consumers, in lieu of or in addition to user devices 13a-c, are possible.

Digital information retrieval complements sensemaking. In one embodiment, a topical search system 12 is integrated into a social indexing system 11. The topical organization provided by the social indexing system 11 through augmented community-based topical indexes can be used advantageously by the topical search system 12, although other sources of indexing could also be used. Search queries from user devices 13a-c are executed against either all of the social indexes or a single focused index, and a dynamically focused and topically-related set of indexes and their top topics, or the top topics within the single focused index are respectively generated by the topical search system 12 for presentation with search results, such as disclosed in commonly-assigned U.S. patent application Ser. No. 12/354,681, filed Jan. 15, 2009, pending, the disclosure of which is incorporated by reference. In addition, online advertising can be blended into topical searching and other retrieval activities.

Figure 2:
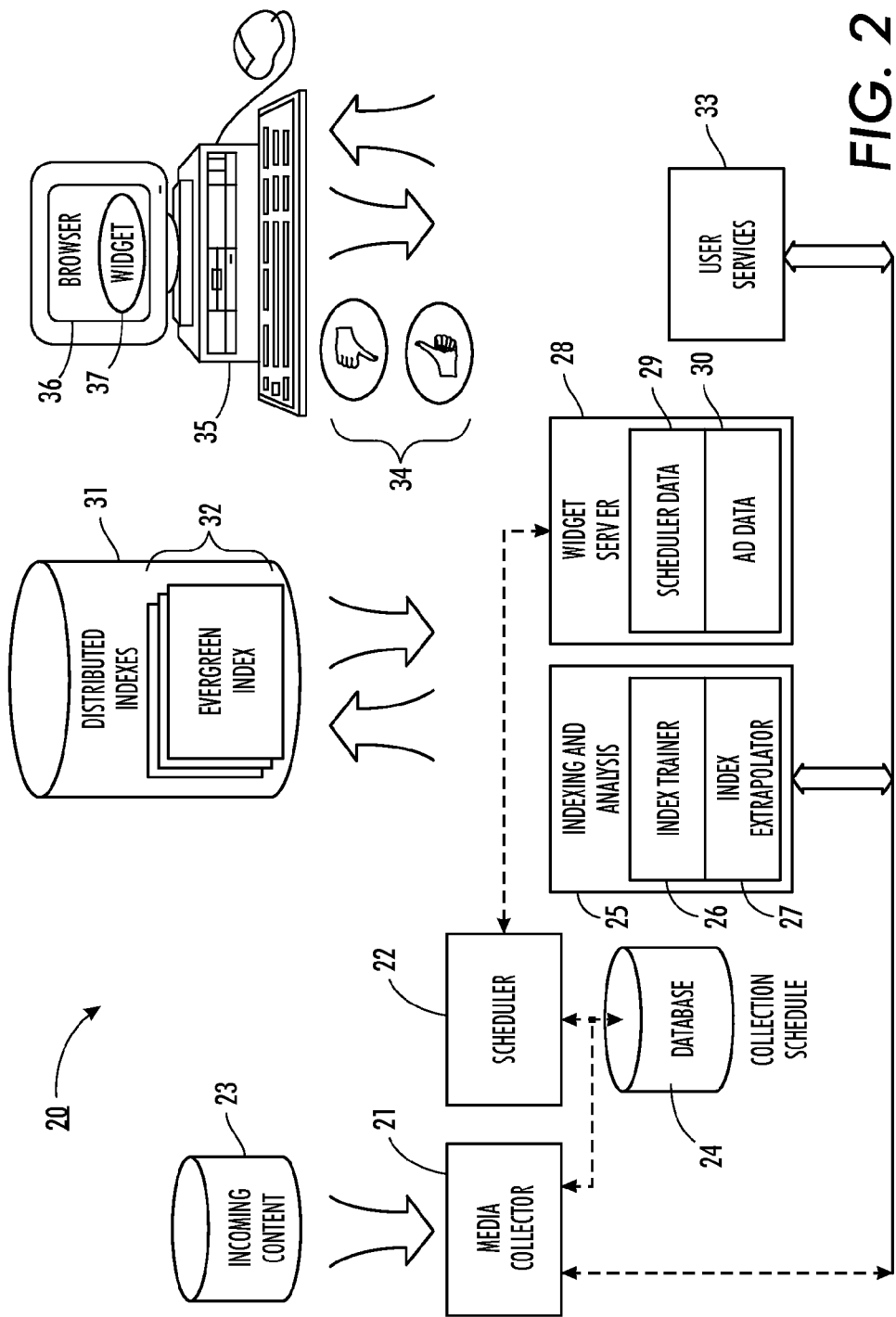
FIG. 2 is a functional block diagram showing principal components used in the environment of FIG. 1.

From a user's point of view, the environment 10 for retrieval appears as a single information portal. However, a set of functionally integrated services work collaboratively behind the scenes to provide the environment 10, which includes widgets that are introduced as Web page-based add-ons to the Web pages of information producers and of information seekers that are members of augmented communities. FIG. 2 is a functional block diagram showing principal components 20 used in the environment 10 of FIG. 1. The components are focused on interfacing a Web browser widget with social indexing. Additional components or functional modules may be included to support other related or complimentary activities, such as discovery, prospecting, and orientation.

The components 20 can be loosely grouped into modules for media collection 21, indexing and analysis 25, widget server 28, and user services 33, which can be implemented on the same or separate interconnected computational platforms. The media collection module 21 obtains incoming content 23 from the open-ended information sources as dictated by a scheduler 22. A media collection schedule is maintained in a database 24 coupled to the scheduler 22.

The incoming content 23 is collected as new digital information based on the collection schedule. New digital information could also be harvested on demand, or based on some other collection criteria. The incoming content 23 can be stored in a structured repository or database (not shown), or indirectly stored by saving hyperlinks or citations to the incoming content 23 in lieu of maintaining actual copies. Additionally, the incoming content 23 can include multiple representations, which differ from the representations in which the digital information was originally stored. Different representations could be used to facilitate displaying titles, presenting article summaries, keeping track of topical classifications, and deriving and using fine-grained topic models, such as described in commonly-assigned U.S. patent application, entitled "System and Method for Performing Discovery of Digital Information in a Subject Area," Ser. No. 12/190,552, filed Aug. 12, 2008, pending, the disclosure of which is incorporated by reference, or coarse-grained topic models, such as described in commonly-assigned U.S. patent application, entitled "System and Method for Providing a Topic-Directed Search," Ser. No. 12/354,681, filed Jan. 15, 2009, pending, the disclosure of which is incorporated by reference. Words in the articles could also be stemmed and saved in tokenized form, minus punctuation, capitalization, and so forth. The fine-grained topic models created by the social indexing system 11 represent fairly abstract versions of the incoming content 23, where many of the words are discarded and word frequencies are mainly kept.

The incoming content 23 is preferably organized through social indexing under at least one topical or "evergreen" social index 32, which may be part of a larger set of distributed topical indexes 31 that covers all or most of the information in the corpus. In one embodiment, each evergreen index 32 is built by the indexing and analysis module 25, which forms the core of a social indexing system, such as described in commonly-assigned U.S. patent application Ser. No. 12/190,552, Id. The evergreen index contains fine-grained topic models, such as finite state patterns, that are created by an index trainer submodule 26, which can be used to test whether new incoming content 23 falls under one or more of the index's topics. Each evergreen index 32 belongs to an augmented social community of on-topic and like-minded users. The social indexing system applies supervised machine learning through the index trainer submodule 26 to bootstrap training material into the fine-grained topic models for each topic and subtopic in the topical index 29. Once trained, the evergreen index can be used for index extrapolation by an index extrapolator submodule 27 to automatically categorize new information under the topics for pre-selected subject areas.

The user services module 33 provides a front-end to user systems 35 for accessing the set of distributed topical indexes 31 and the incoming content 23, to perform search queries on the set of topical indexes 31 or just a single topical index 32, and to access search results. Each topical index 32 is tied to a community of users, known as an "augmented" community, which has an ongoing interest in a core subject area. In a further embodiment, the community continually "vets" the incoming information 23 by voting 34 on articles categorized under each topic through the community's topical index 32.

In general, users access the topical indexes 31 and the incoming content 23 using a Web browser 36 or similar application executing on their user system 35. One or more widgets 37 can be displayed by the Web browser 36 to interface the user system 35 to the social indexing system. Each widget 37 executes in concert with the widget server 38, as further described below beginning with reference to FIG. 3. Briefly, a widget 37 starts up when a particular Web page is served, such as a Web page belonging to a blogger or augmented community member. The widget server 28 fields a request from the widget 37 to provide topically-relevant information, such as a subindex, "hot" topics, select articles, or a focus on topics of interest, which can be dynamically-generated, such as for the blogger, or pre-selected, such as by the augmented community member. The hot topics can be selected, such as described in commonly-assigned U.S. patent application, entitled "System and Method for Managing User Attention by Detecting Hot and Cold topics in Social Indexes," Ser. No. 12/360,834, filed Jan. 27, 2009, pending, the disclosure of which is incorporated by reference, while topic focus can be achieved, such as described in commonly-assigned U.S. patent application, entitled "System and Method for Using Banded Topic Relevance and Time for Article Prioritization" Ser. No. 12/360,823, filed Jan. 27, 2009, pending, the disclosure of which is incorporated by reference. The topically-relevant information can be tied to the current Web page being viewed by specifying scheduler data 29 to the scheduler 22 and thereby initiating the process of identifying topics in the augmented community's topical index 32, which are pertinent to the contents of the Web page. The widget server 28 formats the topically-relevant information for presentation by the widget 37 through the Web browser 26.

In a further embodiment, the widget server 28 also identifies and provides advertising data 30 in-place with the topically-relevant information. The advertising data 30 is also topically-related to the contents of the Web page through various approaches. For instance, the advertising data 30 could be broadened by identifying the topics associated with articles or parts of a social index of particular interest to a user, such as described in commonly-assigned U.S. patent application, entitled "System and Method for Providing Topic-Guided Broadening of Advertising Targets in Social Indexing," Ser. No. 12/436,060, filed May 5, 2009, pending, the disclosure of which is incorporated by reference. Additionally, the advertising data 30 could be targeted to specific social communities whose topics reflect an interest most closely matched to the interests of particular advertisers, such as described in commonly-assigned U.S. patent application, entitled "System and Method for Providing Community- Based Advertising Term Disambiguation," Ser. No. 12/436, 067, filed May 5, 2009, pending, the disclosure of which is incorporated by reference.

In a still further embodiment, advertisements that use up to the entire display space occupied by a full widget on a Web page can periodically and briefly be served as an alternative to including more space-constrained advertisements with other content in the widget. For example, a widget on the topic of wine tasting could display content covering a wide range of wine tasting-related topics. Every few minutes, though, the widget could run a short advertisement, for instance, an animation or short video about wine for, say, five seconds, before returning to displaying the topically-relevant information. This approach tries to get an effective advertisement placed, which is only shown for a brief moment. Thus, the Web page's advertisement time-shares the display space within a Web page via a widget with the underlying Web content. Still other techniques for matching and displaying the advertising data 30 to the Web page contents are possible.

Widget Services

Figure 3:
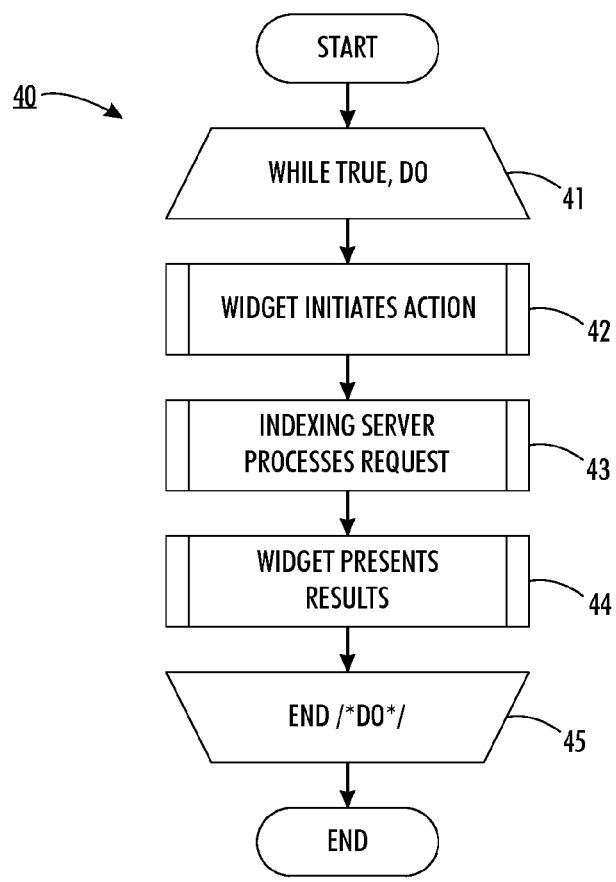
FIG. 3 is a flow diagram showing a method for interfacing a Web browser widget with social indexing in accordance with one embodiment.

A social indexing system is a set of services provided by an integrated digital information-processing environment. Widgets can tie specific Web pages, such as blogs, to topically-organized social indexes, as well as enable members of augmented communities to present their perspectives on particular subject areas through a window into their communities' social indexes. FIG. 3 is a flow diagram showing a method 40 for interfacing a Web browser widget with social indexing in accordance with one embodiment. The method 40 is performed as a series of process or method steps performed in part by, for instance, a general purpose programmed computer, such as user devices 13a-c and servers 14a-c (shown in FIG. 1).

Figure 4:
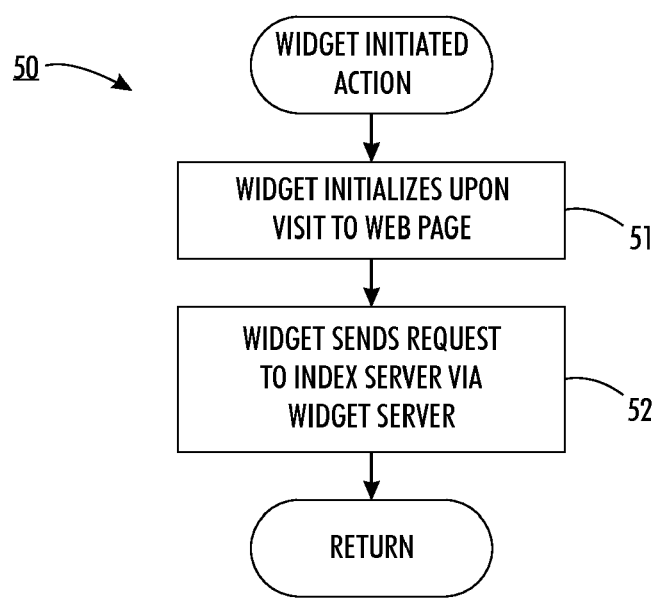
FIG. 4 is a flow diagram showing a routine for initiating action via a widget for use in the method of FIG. 3.

Each widget 37 executes as part of a continuous cycle (steps 41-45), at the start of which the widget 37 initiates action (step 42) by sending a request to the indexing and analysis module 25 (or simply, "indexing server") via the widget server 25, as further described below with reference to FIG. 4. The indexing server 25 processes the request in conjunction with the widget server 28 (step 43) by crawling the Web page currently being presented by the Web browser and selecting topically-relevant information, as further described below with reference to FIG. 5, or, alternatively, providing pre-selected topically-relevant information, as further described below with reference to FIG. 6. Finally, the results generated by the indexing server 25 are presented to the user by the widget 37 (step 44), as further described below with reference to FIG. 7. The method is repeated continually with each Web page to which a widget 37 is tied. Still other widget operations are possible with respect to providing topically-relevant information.

A widget 37 is an information object or module that is placed in the contents of a Web page. The widget provides a user interface for displaying topically-relevant information and, if provided, advertising, and is therefore visually embedded into the Web page display, as further described below with reference to FIG. 8. Each widget can be implemented in a software programming language, like JavaScript, DHTML, and Adobe Flash, such as described in http://en.wikipedia.org/wiki/Web_widget the disclosure of which is incorporated by reference. FIG. 4 is a flow diagram showing a routine 50 for initiating action via a widget 37 for use in the method 40 of FIG. 3. When a user looks at a blogger's Web page, or any other Web page, the widget 37 initializes (step 51) by starting up and generating a request for topically-relevant information for a particular augmented community. The request is then sent to the indexing server 25 via the widget server 28 (step 52), after which the widget waits for results.

Figure 5:
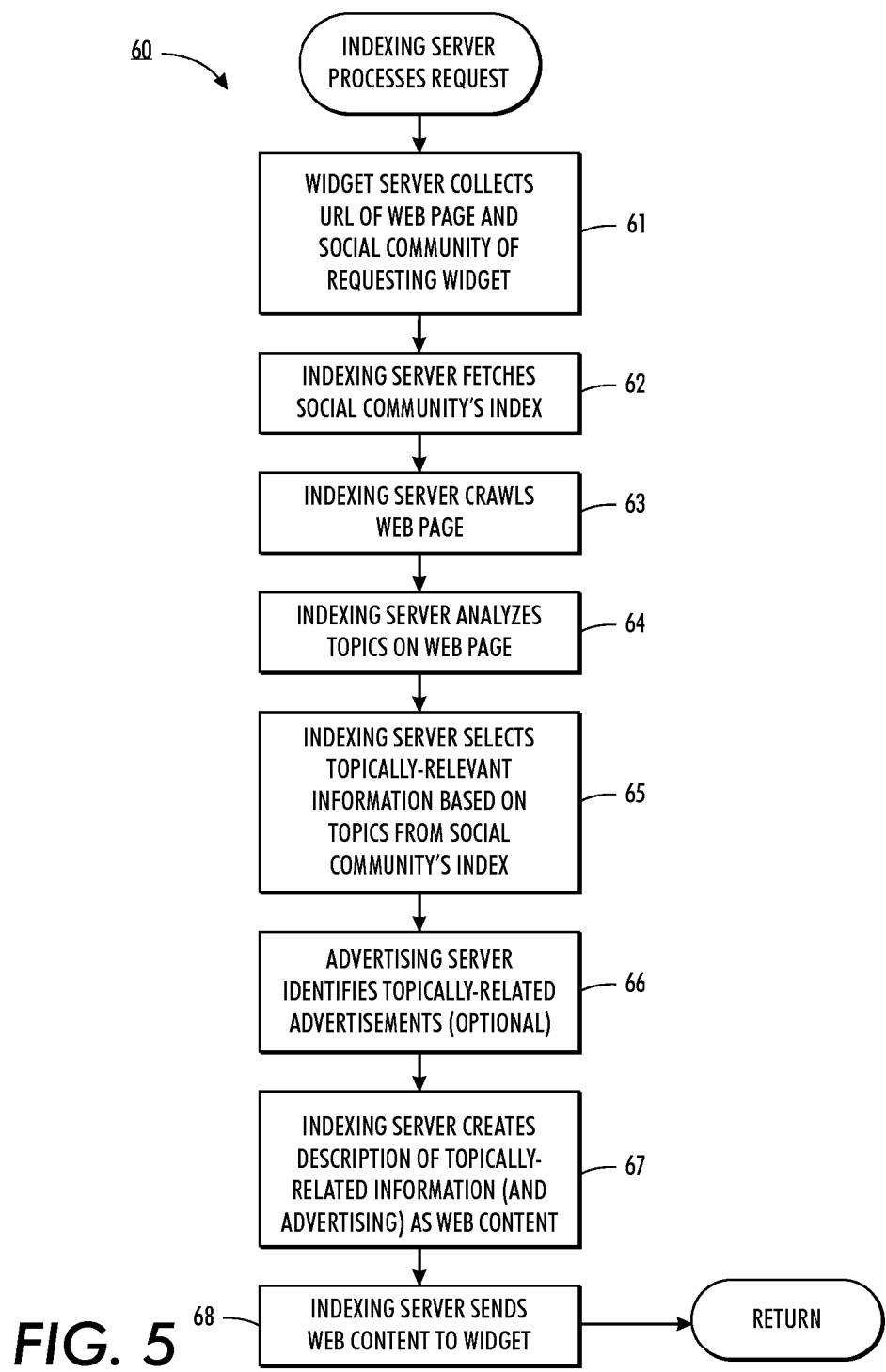
FIG. 5 is a flow diagram showing a routine for processing requests via an index server for use in the method of FIG. 3.

Widgets 37 execute in a Web browser 36 to provide a user interface and topical conduit into the social indexing system. The bulk of the work, though, is performed by the indexing server 25 and widget server 28, which work in the background to select topically-relevant information for display by the widget 37. In one embodiment, the widget server dynamically-generates the topically-relevant information based on an identified Web page or site, such as for a blogger. FIG. 5 is a flow diagram showing a routine 60 for processing requests via an index server for use in the method 40 of FIG. 3. Each widget request is received by the widget server 28, which collects the URL of the Web page currently being viewed via the Web browser and determines the augmented community of the requesting widget 37 (step 61). The widget server 28 fetches the social community's social index (step 62) and instructs the indexing server 25 to crawl and collect the contents of the Web page identified by the URL (step 63) by specifying scheduler data 29 that is conveyed to the collection schedule maintained by the scheduler's database 24. In turn, the scheduler 22 instructs the media collector 21 to collect the Web page at the appropriate time. In a further embodiment, the Web page may be cached, or the media collector 21 may only retrieve the Web page if the content of the Web page is newer than any content previously obtained.

The indexing server 25 analyzes the topics on the Web page (step 64) and identifies a set of subtopics through various index extrapolation approaches. In one embodiment, the indexing server 25 generates fine-grained topic models, such as described in commonly-assigned U.S. patent application Ser. No. 12/190,552, Id. Briefly, with this approach, each of the topics in a subject area and training material for the topics are designated. The topic models are built for each of the topics. Thereafter, the topic models are evaluated against the training material and the digital information from the corpus is organized by the topics using the topic models into each social index. In a further embodiment, the indexing server 25 generates the topics as a persistent guide, such as described in commonly-assigned U.S. Patent Publication No. 2008/0027707, published Jan. 31, 2008, pending, the disclosure of which is incorporated by reference. Briefly, with this approach, a content portion from the articles of digital information is displayed in the Web browser. Information items from the content portion are determined. A set of guide elements for the articles of digital information that correspond to the information items from the content portion are also determined. The set of guide elements in the Web browser are then displayed in a persistent interactive guide, wherein the persistent interactive guide is organized as each social index. Still other techniques for performing index extrapolation are possible.

In a still further embodiment, the content from the publisher, blogger, or other source where the widget is placed can be analyzed. For instance, each of the Web pages that form part of the Web site to which the Web page currently in view on the Web browser belongs can be crawled, collected, and analyzed. Similarly, each of the Web pages originating from a common source to which the Web page currently in view on the Web browser belongs can be crawled, collected, and analyzed. Some publishers may have content that is not immediately accessible in a Web page, but which resides in a database associated with their Web site. For example, content for the Wall Street Journal's or New York Times' Web sites is archived in an associated database. As well, Web pages for displaying the content may need to be generated as part of the analysis.

Upon receiving the results of the topical analysis, the indexing server 25 selects topically-relevant information based on topics from the augmented social community's index that are related to the Web page (step 65). The indexing server 25 could prepare a summary based on an index, emphasizing a selection of other information from other sources on the Web that are related to the content of the current web page. The indexing server 25 also could tailor the selection of other sources to those sources that are highly rated in the current social index. Finally, the indexing server 25 could provide a guide to other articles that were created by the same publisher, supporting interaction for reading or purchasing further content.

In a further embodiment, the indexing server 25 requests topically-related advertisements (step 66), as described supra. The indexing server 25 then creates a description of the topically-relevant information and, if provided, advertising data 30, as Web content (step 67), such as by generating HTML or code in a suitable page description language. In general, the topically-relevant information is prepared as a display of information formatted according to information type, such as subindex. Other formatting decisions may be required. For instance, when showing articles, the amount and type of particular information, such as titles, URLs, number of articles, and so forth, need be decided. Similarly, if showing topics or "hot" topics, specific topics need be selected. Lastly, the indexing server 35 sends the Web content to the widget 37 (step 68) for display via the Web browser.

Figure 6:
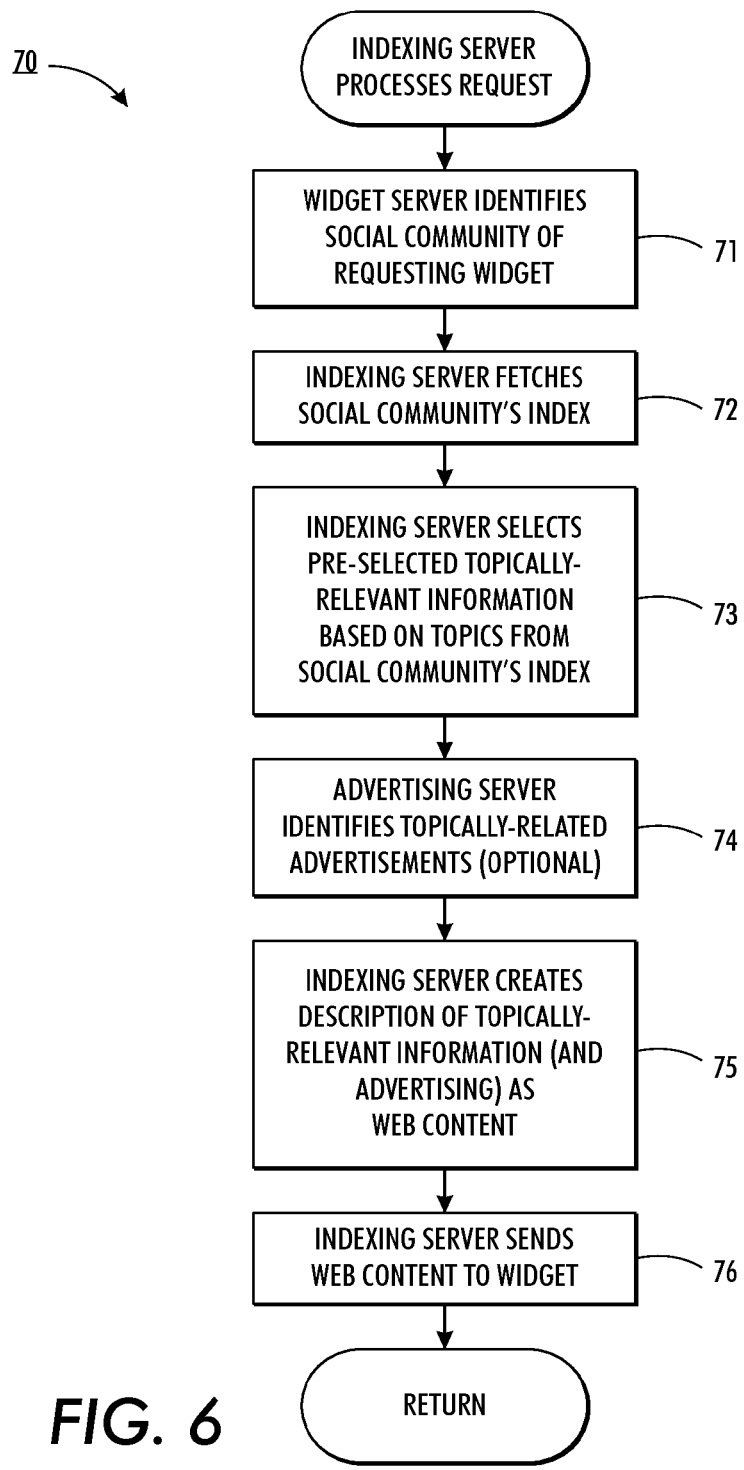
FIG. 6 is a flow diagram showing a routine for processing requests via an index server for use in the method of FIG. 3 in accordance with a further embodiment.

In a further embodiment, the widget server provides pre-selected topically-relevant information such as for an augmented community member. The pre-selected topically-relevant information can thus afford a perspective of the member's chosen subject area, as topically organized through his or her augmented community's social index. FIG. 6 is a flow diagram showing a routine for processing requests via an index server for use in the method of FIG. 3 in accordance with a further embodiment. As before, each widget request, including parameterized information, is received by the widget server 28, which determines the augmented social community of the requesting widget 37 (step 71). The parameterized information could be information from the Web site where the widget is placed, such as information from a social networking Web site. The information could also include a unique identifier for the widget. Moreover, the information could include results from user interactions with the widget, indicating user preferences, votes or comments on articles, or any other information relevant to the user's interest in the subject matter of the social index. The request may identify a member of a social community, as known by the widget. The widget may have a unique identity used by the social indexing system, and connecting to other information including a history of user interactions. The request may convey other information derived from interactions with the user of the widget, such as index or topic selections, display preferences, article votes, comments, or data from interaction with the social index or widget hosting site. A given widget may connect to more than one index in a social indexing system. The widget server 28 fetches the social community's social index (step 72). The indexing server 25 selects topically-relevant information based on topics from the augmented social community's index, such as pre-selected by the member, that are topically-related to the Web page (step 73). In a further embodiment, the indexing server 25 requests topically-related advertisements (step 74), as described supra. The indexing server 25 then creates a description of the topically-relevant information and, if provided, advertising data 30, as Web content (step 75), such as by generating HTML or code in a suitable page description language. Lastly, the indexing server 35 sends the Web content to the widget 37 (step 76) for display via the Web browser.

Figure 7:
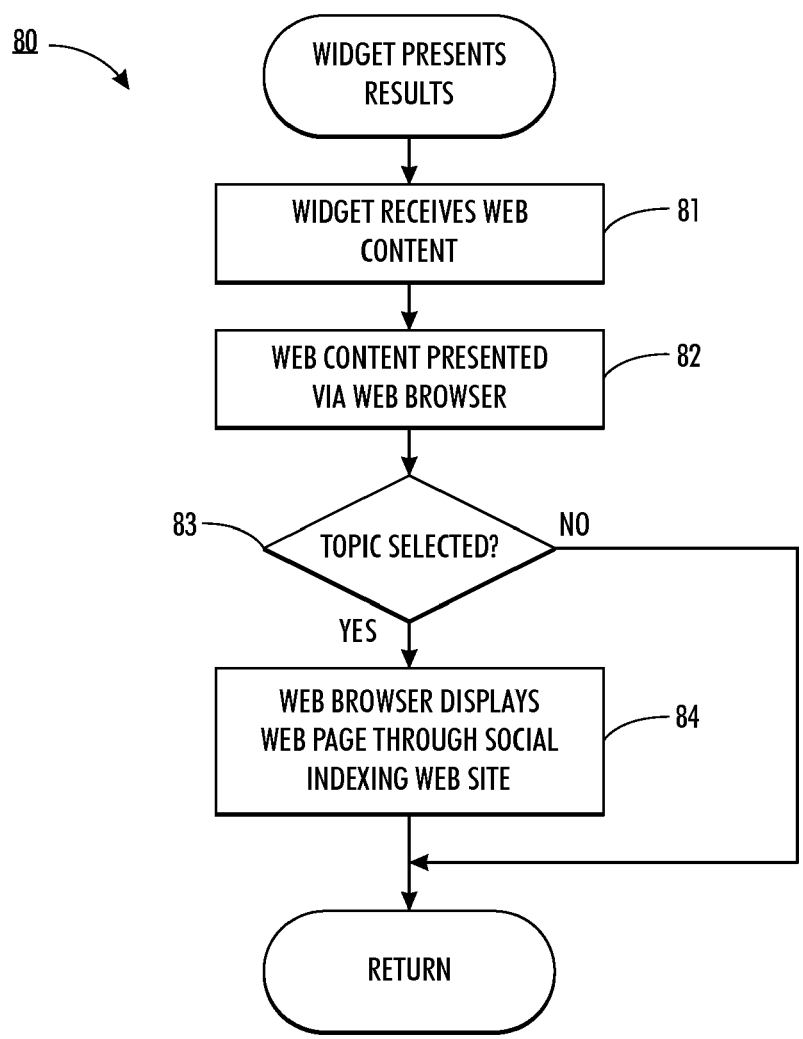
FIG. 7 is a flow diagram showing a routine for presenting results via a widget for use in the method of FIG. 3.

A widget 37 both requests and displays information which is topically germane to the Web page currently being viewed by a user through a Web browser 36. FIG. 7 is a flow diagram showing a routine 80 for presenting results via a widget for use in the method 40 of FIG. 3. The Web contents generated and sent by the indexing server 25 in response to the widget's request is received (step 81) and presented via the Web browser (step 82). If a topic within the topically-relevant information is selected by the user (step 83), the Web browser displays a Web page retrieved from the social indexing Web site for the augmented community, where additional articles can be found. Similarly, the Web browser processes any selections of advertisements, when advertising data 30 is provided and displayed. Still other widget operations are possible with respect to displaying and selection of the Web content.

Widget Example

Figure 8:
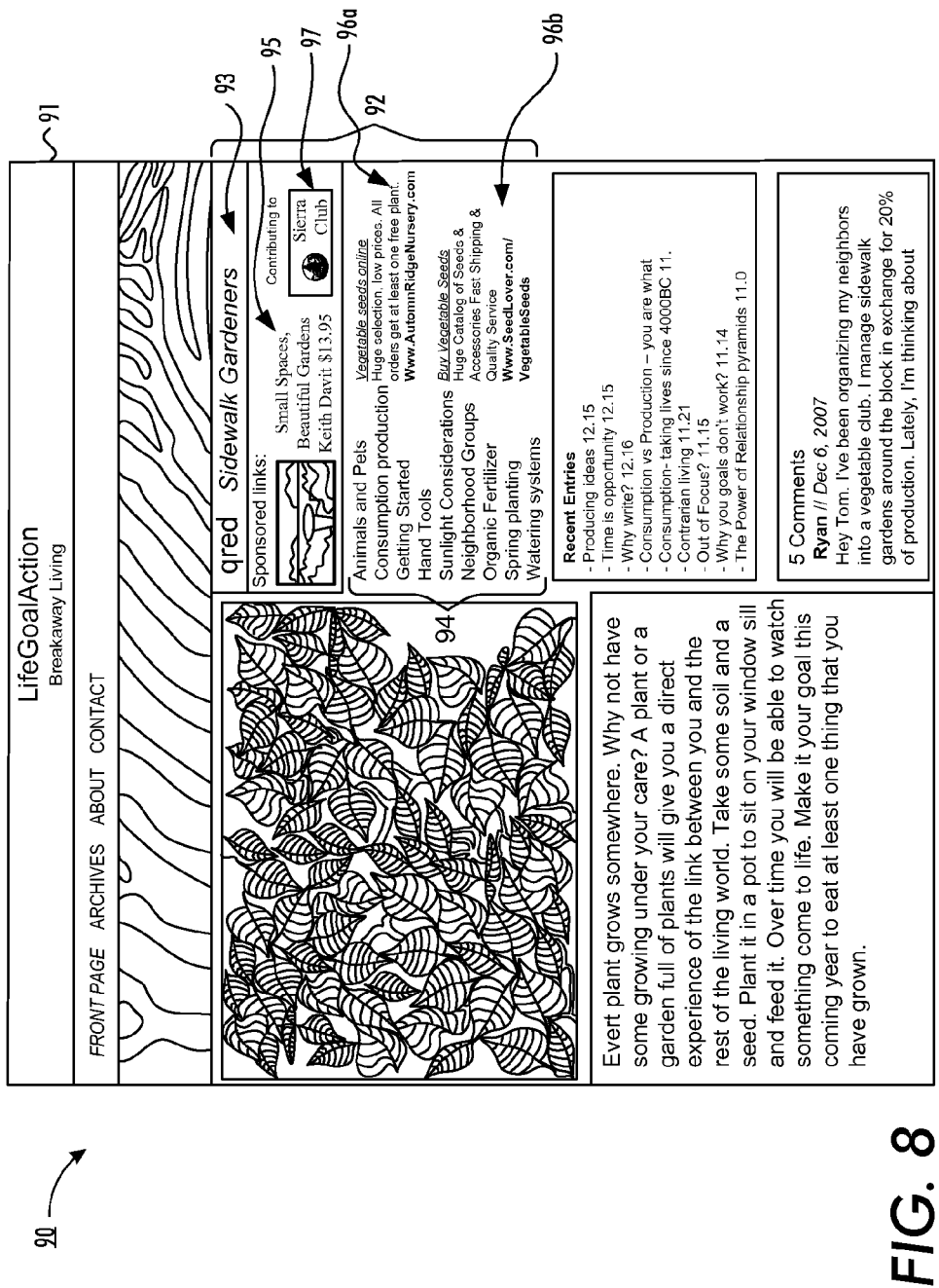
FIG. 8 is a screen shot showing, by way of example, a social indexing widget within a Web browser window.

FIG. 8 shows a screen shot 90 of the visual appearance of a social-indexing widget 92. In this example, the widget has been added to a Web page 91 called "LifeGoalAction," where a blogger is writing an article about gardening.

The widget code calls up the social indexing system, provides the URL of the Web page of the blog and specifies a request for an index to the "Sidewalk Gardens" community in the social index. Social indexes are further described in commonly-assigned U.S. Provisional Patent Application, entitled "System and Method for Community-Based Term Disambiguation for Segmenting Advertising Markets," Ser. No. 61/092,741, filed Aug. 28, 2008, the disclosure of which is incorporated by reference. The Sidewalk gardens community already maintains a topical index. The indexing system then crawls the Web page with the given URL and analyzes the topic on the page, or any other related pages, on the blogger's Web site. The indexing system selects topically-relevant information, here, a subindex, by selecting relevant topics out of the index for the sidewalk gardens community. The indexing system may also use the topics to target relevant advertisements for the widget. Finally, the indexing system creates a description for the widget's display as Web content and sends the description back to the widget. The widget then displays the Web content via the Web browser and processes any subsequent user selections.

The widget is the boxed region with the heading 93 "cued Sidewalk Gardeners." The identified topics 94 are "Animals and Pets," "Consumption Production," "Getting Started," "Hand Tools," "Sunlight Considerations," "Neighborhood Groups," "Organic Fertilizers," "Spring Planting," and "Watering Systems." If a user clicks on any of the topics, the browser will display a page on the social indexing site where additional articles on the topic may be found.

The widget also contains advertisements, in the form of a sponsored link 95 to a book on gardening as well as two advertisements 96*a*, 96*b* for seeds. A user can click on these links to get more information about the products or purchase them. A logo 97 for the Sierra Club indicates that advertising revenue for advertisements on the widget is being shared with the Sierra Club.

While the invention has been particularly shown and described as referenced to the embodiments thereof, those skilled in the art will understand that the foregoing and the other changes in form and detail may be made therein without departing from the spirit and scope.

What is claimed is:

1. A computer-implemented system for interfacing a Web browser widget with social indexing, comprising:
 a collection of articles of digital information and a plurality of social indexes that are each associated with a social community, that are both electronically-stored in persistent storage, each social index comprising a hierarchy of topics that each relate to at least one such article and a fine-grained topic model for each topic, each of the fine-grained topic models comprising a pattern evaluable against the articles, wherein the pattern identifies such articles matching the fine-grained topic model's topic;
 a computer comprising a processor and memory within which code for execution by the processor is stored, comprising:
  a topic builder maintaining for each topic in each of the social indexes a coarse-grained topic model comprising:
   a characteristic word extractor that extracts characteristic words from the articles identified by the fine-grained topic model of each topic; and
   a characteristic word scorer that assigns scores to the characteristic words:
  a widget server interfacing to a widget remotely executing on a Web browser, accepting a request from the widget that identifies one such social community, and identifying a Web page currently in view on the Web browser;
  a media collector obtaining content comprised in the Web page;
  a social indexing server obtaining the social index for the social community, evaluating the fine-grained topic models in the social index against the content, and selecting topically-relevant information based on the topics in the social index corresponding to those of the fine-grained topic models matched to the content; and
 a user interface visually providing the topically-relevant information to the widget arranged for presentation through the Web browser via the widget on the Web page.

2. A system according to claim 1, further comprising:
 a Web site evaluator determining at least one of a Web site comprising a plurality of Web pages, including the Web page currently in view on the Web browser, and a plurality of Web pages originating from a common source as the Web page currently in view on the Web browser, and including the content of each of the Web pages comprised in the Web site with the content of the Web page currently in view on the Web browser.

3. A system according to claim 1, wherein the topics for each social index are selected through index extrapolation.

4. A system according to claim 3, further comprising:
 a persistent context-aware guide server displaying a content portion from the articles of digital information in the Web browser, determining information items from the content portion, determining a set of guide elements for the articles of digital information that correspond to the information items from the content portion,
 wherein the set of guide elements are displayed in the Web browser in a persistent interactive guide, wherein the persistent interactive guide is organized as each such social index.

5. A system according to claim 1, further comprising at least one of:
 an in-place advertising module including advertising content for one or more advertisements, which are each topically-related to the content of the Web page currently in view on the Web browser with the topically-relevant information; and
 a full widget advertising module including advertising content for one or more advertisements, which are each topically-related to the content of the Web page currently in view on the Web browser in lieu of the topically-relevant information and for short duration.

6. A system according to claim 5, wherein a plurality of advertising expressions that are each associated with the advertising content for an online advertiser are received, and each of the advertising expressions are successively matched to the one or more topics in the topically-relevant information followed by matching words descriptive of the one or more topics.

7. A system according to claim 5, wherein each social community exhibiting the most closely-matched similarity to the advertising content for an online advertiser based on their social indexes is chosen, and the advertising content for the social community that was identified by the widget is placed.

8. A system according to claim 1, further comprising at least one of:
 a cache from which the content from a cached copy of the Web page identified is obtained; and
 a caching module retrieving the Web page identified upon determining content newer than any content previously obtained is present in the Web page identified.

9. A system according to claim 1, wherein the topically-relevant information comprises one or more of a subindex, hot topics, select articles, and a focus on topics of interest.

10. A computer-implemented method for interfacing a Web browser widget with social indexing, comprising:
 maintaining a collection of electronically-stored articles of digital information and a plurality of social indexes that are each associated with a social community, each social index comprising a hierarchy of topics that each relate to at least one such article and a fine-grained topic model for each topic, each of the fine-grained topic models comprising a pattern evaluable against the articles, wherein the pattern identifies such articles matching the fine-grained topic model's topic;
 maintaining for each topic in each of the social indexes a coarse-grained topic model comprising:
  extracting characteristic words from the articles identified by the fine-grained topic model of each topic; and
  assigning scores to the characteristic words;
 interfacing to a widget remotely executing on a Web browser and accepting a request from the widget that identifies one such social community;
 identifying a Web page currently in view on the Web browser;
 obtaining content comprised in the Web page;
 obtaining the social index for the social community;
 evaluating the fine-grained topic models in the social index against the content;
 selecting topically-relevant information based on the topics in the social index corresponding to those of the fine-grained topic models matched to the content; and
 providing the topically-relevant information to the widget arranged for presentation through the Web browser via the widget on the Web page.

11. A method according to claim 10, further comprising:
 determining at least one of a Web site comprising a plurality of Web pages, including the Web page currently in view on the Web browser, and a plurality of Web pages originating from a common source as the Web page currently in view on the Web browser; and including the content of each of the Web pages comprised in the Web site with the content of the Web page currently in view on the Web browser.

12. A method according to claim 10, further comprising:
selecting the topics for each social index through index extrapolation.

13. A method according to claim 12, further comprising:
displaying a content portion from the articles of digital information in the Web browser;
determining information items from the content portion;
determining a set of guide elements for the articles of digital information that correspond to the information items from the content portion; and
displaying the set of guide elements in the Web browser in a persistent interactive guide, wherein the persistent interactive guide is organized as each such social index.

14. A method according to claim 10, further comprising at least one of:
including advertising content for one or more advertisements, which are each topically-related to the content of the Web page currently in view on the Web browser with the topically-relevant information; and
including advertising content for one or more advertisements, which are each topically-related to the content of the Web page currently in view on the Web browser in lieu of the topically-relevant information and for short duration.

15. A method according to claim 14, further comprising:
receiving a plurality of advertising expressions that are each associated with the advertising content for an online advertiser; and
successively matching each of the advertising expressions to the one or more topics in the topically-relevant information followed by matching words descriptive of the one or more topics.

16. A method according to claim 14, further comprising:
choosing each social community exhibiting the most closely-matched similarity to the advertising content for an online advertiser based on their social indexes; and
placing the advertising content for the social community that was identified by the widget.

17. A method according to claim 10, further comprising at least one of:
obtaining the content from a cached copy of the Web page identified; and
retrieving the Web page identified upon determining content newer than any content previously obtained is present in the Web page identified.

18. A method according to claim 10, wherein the topically-relevant information comprises one or more of a subindex, hot topics, select articles, and a focus on topics of interest.

19. A computer-implemented system for interfacing an individualized Web browser widget with social indexing, comprising:
a collection of articles of digital information and a plurality of social indexes that are each associated with a social community, that are both electronically-stored in persistent storage, each social index comprising a hierarchy of topics that each relate to at least one such article and a fine-grained topic model for each topic, each of the fine-grained topic models comprising a pattern evaluable against the articles, wherein the pattern identifies such articles matching the fine-grained topic model's topic;
a computer comprising a processor and memory within which code for execution by the processor is stored, comprising:
a topic builder maintaining for each topic in each of the social indexes a coarse-grained topic model comprising:
a characteristic word extractor that extracts characteristic words from the articles identified by the fine-grained topic model of each topic; and
a characteristic word scorer that assigns scores to the characteristic words
a widget server interfacing to a widget remotely executing on a Web browser, and accepting a request from the widget including parameterized information;
a social indexing server obtaining one or more social indexes and selecting topically-relevant information from the social indexes; and
a user interface visually providing the topically-relevant information to the widget arranged for presentation through the Web browser via the widget on the Web page.

20. A system according to claim 19, wherein the request from the widget identifies a member of one such social community and the topically-relevant information comprises the topics in the social index as selected by the member.

21. A system according to claim 19, wherein the parameterized information comprises at least one of information from a Web site where the widget is placed, a unique identifier for the widget, and results from user interactions with the widget comprising one or more of indicating user preferences, votes or comments on articles, or information relevant to the user's interest in the subject matter of the social index.

22. A computer-implemented method for interfacing an individualized Web browser widget with social indexing, comprising:
maintaining electronically-stored a collection of articles of digital information and a plurality of social indexes that are each associated with a social community, each social index comprising a hierarchy of topics that each relate to at least one such article and a fine-grained topic model for each topic, each of the fine-grained topic models comprising a pattern evaluable against the articles, wherein the pattern identifies such articles matching the fine-grained topic model's topic;
maintaining for each topic in each of the social indexes a coarse-grained topic model comprising:
extracting characteristic words from the articles identified by the fine-grained topic model of each topic; and
assigning scores to the characteristic words;
interfacing to a widget remotely executing on a Web browser;
accepting a request from the widget including parameterized information;
obtaining one or more social indexes and selecting topically-relevant information from the social indexes; and
providing the topically-relevant information to the widget arranged for presentation through the Web browser via the widget on the Web page.

23. A method according to claim 22, wherein the request from the widget identifies a member of one such social community and the topically-relevant information comprises the topics in the social index as selected by the member.

24. A method according to claim 22, wherein the parameterized information comprises at least one of information from a Web site where the widget is placed, a unique identifier for the widget, and results from user interactions with the widget comprising one or more of indicating user preferences, votes or comments on articles, or information relevant to the user's interest in the subject matter of the social index.

\* \* \* \* \*